United States Patent
Bianco et al.

(10) Patent No.: US 9,628,540 B2
(45) Date of Patent: Apr. 18, 2017

(54) SYSTEMS AND METHODS FOR HANDLING MULTIPLE CONCURRENT SESSION INITIATION PROTOCOL TRANSACTIONS

(71) Applicant: VONAGE AMERICA INC., Holmdel, NJ (US)

(72) Inventors: Itay Bianco, Tel-Aviv (IL); Reut Yedidim, Rosh-Haayin (IL); Gil Osher, Rehovot (IL); Roni Salfati, Hod Hashron (IL); Sagie Machlin, Richon Lezion (IL)

(73) Assignee: VONAGE AMERICA INC., Holmdel, NJ (US)

( * ) Notice: Subject to any disclaimer, the term of this patent is extended or adjusted under 35 U.S.C. 154(b) by 5 days.

(21) Appl. No.: 14/509,479

(22) Filed: Oct. 8, 2014

(65) Prior Publication Data
US 2016/0105480 A1    Apr. 14, 2016

(51) Int. Cl.
*H04L 12/66*  (2006.01)
*H04L 29/06*  (2006.01)

(52) U.S. Cl.
CPC .......... *H04L 65/80* (2013.01); *H04L 65/1006* (2013.01); *H04L 65/1069* (2013.01)

(58) Field of Classification Search
None
See application file for complete search history.

(56) References Cited

U.S. PATENT DOCUMENTS

| | | | | |
|---|---|---|---|---|
| 2006/0050683 A1* | 3/2006 | Wall | ............ | H04L 67/322 370/352 |
| 2007/0253412 A1* | 11/2007 | Batteram | ............ | H04L 29/06027 370/389 |
| 2008/0031258 A1* | 2/2008 | Acharya | ............ | H04L 47/10 370/395.42 |
| 2009/0175279 A1* | 7/2009 | Gao | ............ | H04L 67/24 370/395.21 |
| 2009/0323558 A1* | 12/2009 | Meenavalli | ............ | H04L 29/06027 370/259 |
| 2011/0213888 A1* | 9/2011 | Goldman | ............ | H04L 63/1458 709/228 |
| 2013/0054684 A1* | 2/2013 | Brazier | ............ | G06Q 10/02 709/203 |
| 2013/0179581 A1* | 7/2013 | Larkin | ............ | H04L 65/1016 709/227 |
| 2013/0185445 A1* | 7/2013 | Larkin | ............ | H04L 65/1016 709/228 |

* cited by examiner

*Primary Examiner* — Bob Phunkulh
(74) *Attorney, Agent, or Firm* — Nixon & Vanderhye P.C.; Joseph Pagnotta

(57) ABSTRACT

Systems and methods for handling the processing of multiple SIP transactions that have been requested at substantially the same time can involve establishing a priority order for processing the SIP transactions, and then individually processing the SIP transactions based on the established priority order. One or more SIP transactions having a lower priority can be held in a SIP processing queue of a software application until the processing of SIP transactions having a higher priority has been completed. Each time that the processing of a higher priority SIP transaction is completed, the next-highest priority SIP transaction in the queue is submitted for processing. Also, where possible, two or more SIP transactions in the queue may be consolidated into a single SIP transaction.

10 Claims, 6 Drawing Sheets

SYSTEMS AND METHODS FOR HANDLING MULTIPLE CONCURRENT SESSION INITIATION PROTOCOL TRANSACTIONS

BACKGROUND OF THE INVENTION

The invention relates to voice over Internet protocol (VOIP) communications, and more specifically to systems and methods for handling the processing of multiple Session Initiation Protocol (SIP) transactions that have been requested at substantially the same time while a dialog is being conducted between two VOIP software applications.

FIG. 1 illustrates an environment in which a first IP telephony software application 102 is able to conduct an IP telephony communication with a second IP telephony software application 104 via a data network 120. The data network 120 could be the Internet, or any other data network through which the first and second IP telephony software applications can communicate. An IP telephony service provider 110 may facilitate the setup, conduct and termination of the IP telephony communication.

Each of the first and second IP telephony software applications 102, 104 could be resident on any type of computer processing device. For example, each of the first and second IP telephony software applications 102, 104 could be resident on a laptop or desktop computer, on a personal data assistant, on a smart phone, or on any other stationary or portable computing device capable of running the IP telephony software application.

The IP telephony communication that is conducted between the first and second IP telephony software applications 102, 104 could be an IP-based audio telephone call, an IP-based video call, an exchange of SMS or MMS messages, or some other type of IP-based communication.

There are many different IP-based communication protocols that can be used to establish such IP communications. Currently, one of the most commonly used protocols is the Session Initiation Protocol, which is commonly called "SIP." SIP is a signaling protocol for initiating, managing and terminating media (e.g., voice, data and video) sessions across packet based data networks that typically use the Internet Protocol (IP), of which VOIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. It uses a location-independent address system feature in which called parties can be reached based on a party's name. SIP supports name mapping and redirection, allowing users to initiate and receive communications from any location.

When a new communication session is established between two IP telephony software applications, the session is commonly referred to as a "dialog." While a dialog is ongoing between two software applications, the two software applications can exchange messages with one another, or modify aspects of the dialog, using certain predetermined, formatted requests. Examples of such SIP requests include INVITE, BYE, REFER and UPDATE.

Typically, when a first, initiating software application sends a request to a second software application, the second software application sends back a response. The first software application may then send an acknowledgment back to the second software application to indicate that the response was received. This sequence of messages, which includes the initial request, a response, and an acknowledgment, are typically referred to as a "transaction." Of course, some transactions only involve a request and a response, such as a BYE transaction.

One characteristic of SIP is that only a single transaction can be processed at any given time by two software applications that are engaged in a dialog. This aspect of SIP can cause a variety of problems if one or both of the software applications requests the processing of multiple SIP transactions at substantially the same time.

For example, assume that first and second IP telephony software applications are engaged in a dialog in the form of an audio telephone call. Assume that the first software application requests the processing of a transaction that will upgrade the audio call to a video call. As a result, a request is sent from the first software application to the second software application indicating that the call is to be upgraded to a video call. Then, before the second software application can send back a response, the first software application determines that it is necessary to place the audio call on hold. This could occur for a variety of reasons, including the receipt of a request from a user to place the call on hold. In this scenario, before processing of the first transaction (to upgrade the audio call to a video call) can be completed, the first software application attempts to send a second request to place the audio call on hold. Because SIP only allows the processing of a single transaction at any given time, processing of the second requested transaction (to place the call on hold) will fail.

Unfortunately, this sequence of events may result in the first software application actually placing the call on hold while the second software application is unaware that the call has been placed on hold. This can result in considerable confusion on the part of the user of the second software application, as it will appear to that user that the call has been prematurely terminated.

Another situation that can be problematic is when first and second software applications are engaged in a SIP dialog, and both the first and second software applications request the processing of transactions at substantially the same time. For example, assume that the first software application requests the processing of a first transaction, and a request message is sent from the first software application to the second software application. However, instead of receiving a response to that request back from the second software application, the first software application receives a request message from the second software application, because the second software application has also requested the processing of a transaction at substantially the same time. Under these circumstances, the first software application would likely send an abort message back to the second software application indicating that the second request must be aborted. The first software application then continues to wait for a response to the first request that it initiated. That response may or may not be forthcoming, depending on whether the second software application received the first request before it began to process the second request for a transaction that it initiated.

Ideally, the second software application will respond to the first request initiated by the first software application, and processing of the first transaction will be successfully completed. The second software application will thereafter re-send its second request for a transaction, and processing of the second transaction also will be completed. However, it is also possible that the second software application never responds to the first request initiated by the first software application. Thus, when two software applications engaged in a SIP dialog both attempt to initiate transaction requests at substantially the same time, various problems can occur.

What is needed is a way to handle multiple SIP transaction requests that are made at substantially the same time—either by a single software application engaged in a dialog, or by two software applications that are engaged in a dialog.

DETAILED DESCRIPTION OF THE INVENTION

Figure 2:
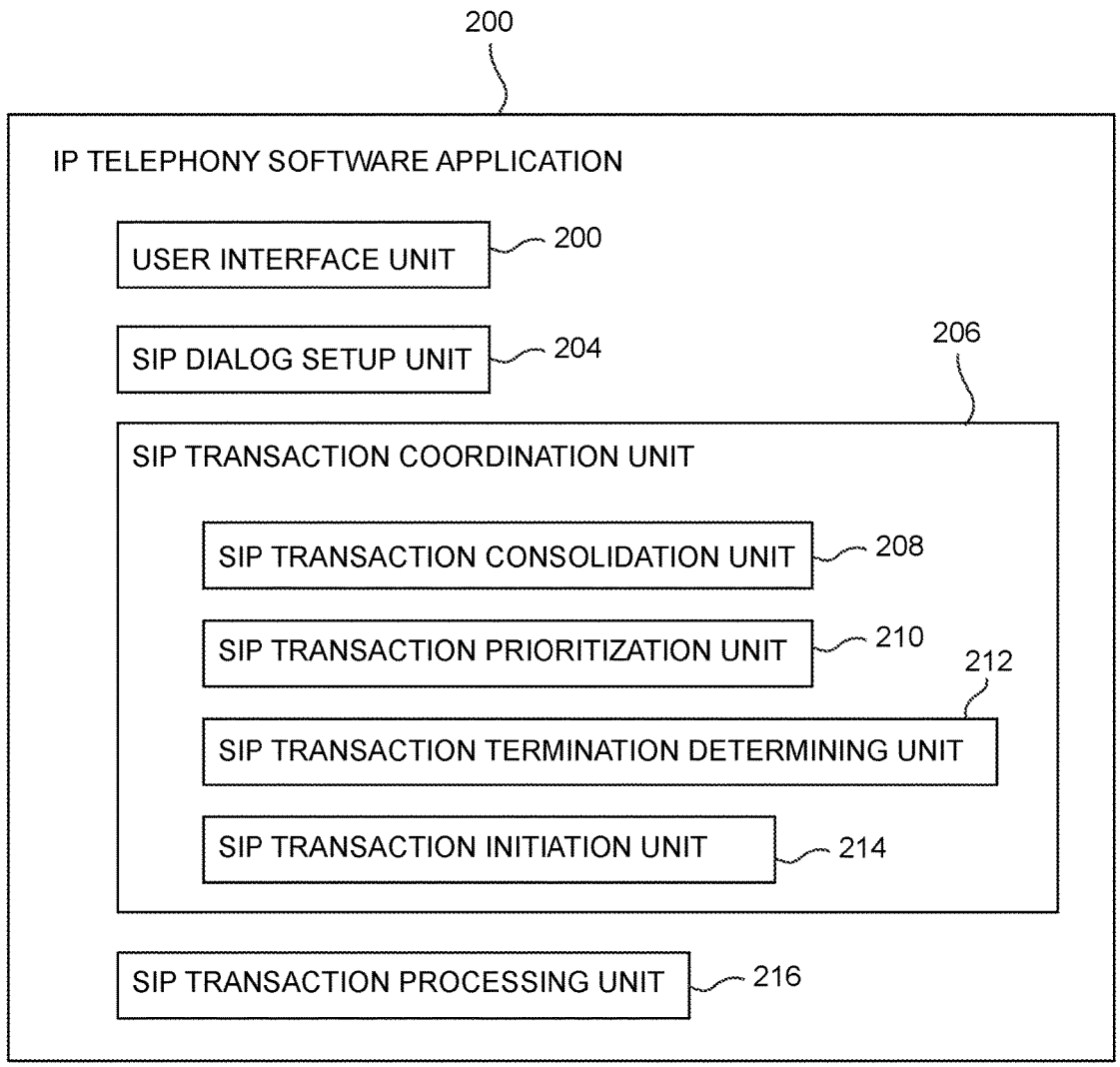
FIG. 2 is a diagram illustrating various elements of an IP telephony software application.

FIG. 2 illustrates various elements of an IP telephony software application 200 that is capable of handling the processing of multiple SIP transactions that are requested at approximately the same time. The IP telephony software application 200 could be resident on any type of stationary or portable computing device. Thus, the IP telephony software application 200 could be resident on a laptop or desktop computer, on a personal data assistant, on a smart phone, or on any other stationary or portable computing device capable of running the IP telephony software application.

The IP telephony software application 200 is configured to utilize the SIP protocol for communicating with other IP telephony software applications. However, the IP telephony software application may also be configured to utilize alternate communication protocols, in addition to SIP.

The IP telephony software application includes a user interface unit 202, which is used to receive instructions from a user, and to provide information to a user. The user would make use of the user interface unit 202 to request the setup of a new IP telephony communication, to receive an incoming IP telephony communication, to conduct IP telephony communications, and to end IP telephony communications. As noted above, the IP telephony communications could include IP-based audio telephone calls, IP-based video calls, an exchange of SMS or MMS messages, as well as other types of IP-based communications.

Figure 1:
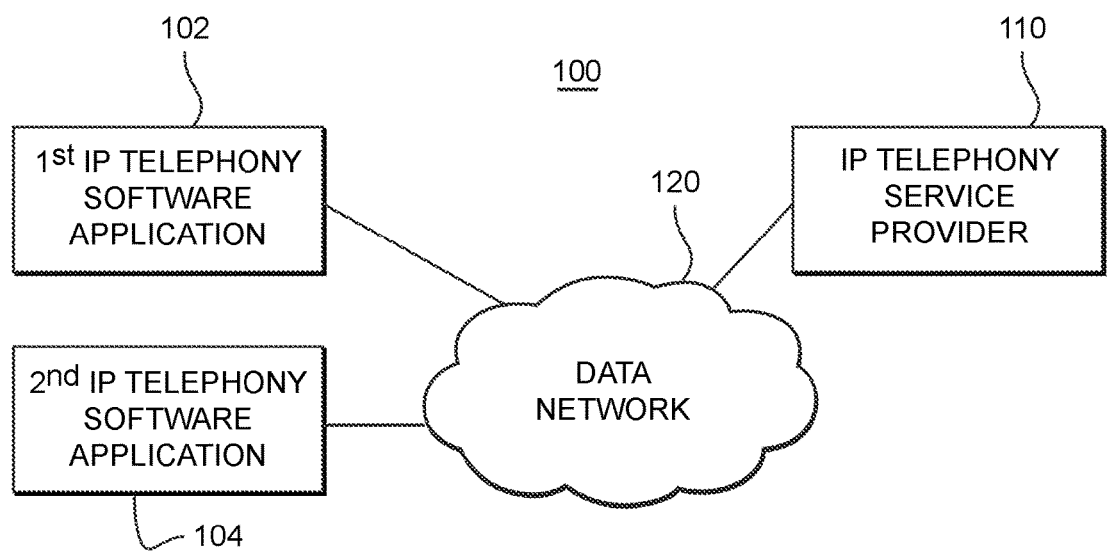
FIG. 1 is a diagram illustrating an environment in which two IP telephony software applications can conduct an IP telephony communication.

A SIP dialog setup unit 204 of the IP telephony software application 200 is responsible for helping to setup new outgoing IP telephony communications, and new incoming IP telephony communications. To do so, the SIP dialog setup unit 204 may communicate with elements of an IP telephony service provider 110, as illustrated in FIG. 1. The elements of the IP telephony service provider 110 could include various gateways and servers that are operated or controlled by the IP telephony service provider 110. In some instances, however, the SIP dialog setup unit 204 may be capable of directly interacting with the SIP dialog setup unit 204 of a second IP telephony software application 200 to setup a new incoming or outgoing IP telephony communication. Thus, the SIP dialog setup unit 204 would not necessarily need to enlist the assistance of an IP telephony service provider 110 in order to setup a new IP telephony communication.

The IP telephony software application 200 also includes a SIP transaction coordination unit 206, which is responsible for coordinating the processing of multiple SIP transactions that have been requested at approximately the same time. The SIP transaction coordination unit 206 includes a SIP transaction consolidation unit 208 that may consolidate two or more requested SIP transactions into a single SIP transaction that can be processed once to accomplish the functions that would have been accomplished by separately processing all of the requested SIP transactions that were consolidated together.

A SIP transaction prioritization unit 210 determines a priority order for processing multiple requested SIP transactions. A SIP transaction termination determining unit 212 determines when processing of a SIP transaction has been completed. A SIP transaction initiation unit 214 is used to initiate processing of a SIP transaction. The functions these elements perform will be discussed in detail below.

A SIP transaction processing unit 216 of the IP telephony software application 200 is actually responsible for processing a requested SIP transaction. In the case of a SIP transaction that is initiated by the IP telephony software application 200, this would typically involve sending an appropriate request message to a second IP telephony software application, receiving and interpreting a response message received back from the second IP telephony software application, and sending an acknowledgment message to the second IP telephony software application upon receipt of the response message. In the case of a SIP transaction that is being initiated by a second IP telephony software application, this would typically involve receiving and interpreting a SIP transaction request from the second IP telephony software application, formulating and sending an appropriate reply message to the second IP telephony software application, and receiving and processing an acknowledgment message received back from the second IP telephony software application.

In some embodiments, additional features would also be present in the IP telephony software application 200 beyond those illustrated in FIG. 2. Also, in some embodiments, not all of the elements depicted in FIG. 2 would be present in the IP telephony software application 200. FIG. 2 only presents one example embodiment, and it only illustrates the features of an IP telephony software application 200 which are particularly relevant to explaining the disclosed systems and methods for handling multiple SIP transactions that have been requested at substantially the same time.

Figure 3:
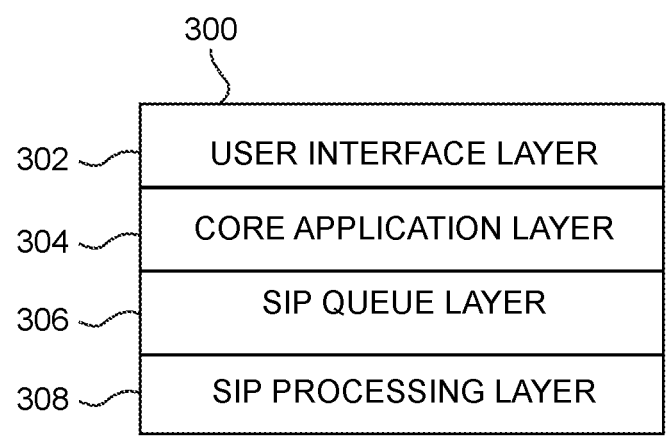
FIG. 3 is a diagram illustrating how different logical or functional layers of an IP telephony software application are arranged with respect to each other.

FIG. 3 illustrates a structure 300 for selected logical or functional layers of an IP telephony software application 200, like the one illustrated in FIG. 2. The logical or functional layers include a user interface layer 302 that is responsible for interacting with a user. Below the user interface layer 302 is a core application layer 304, which includes the logic and processing of the main functions of the IP telephony software application. Below the core application layer 304 is a SIP queue layer 306 that receives requests for the processing of SIP transactions. Requests for the processing of SIP transactions can be received from the core application layer 304 and/or from a separate IP telephony software application, as will be explained in greater detail below. Below the SIP queue layer 306 is a SIP processing layer 308 that is actually responsible for processing a requested SIP transaction.

Figure 4:
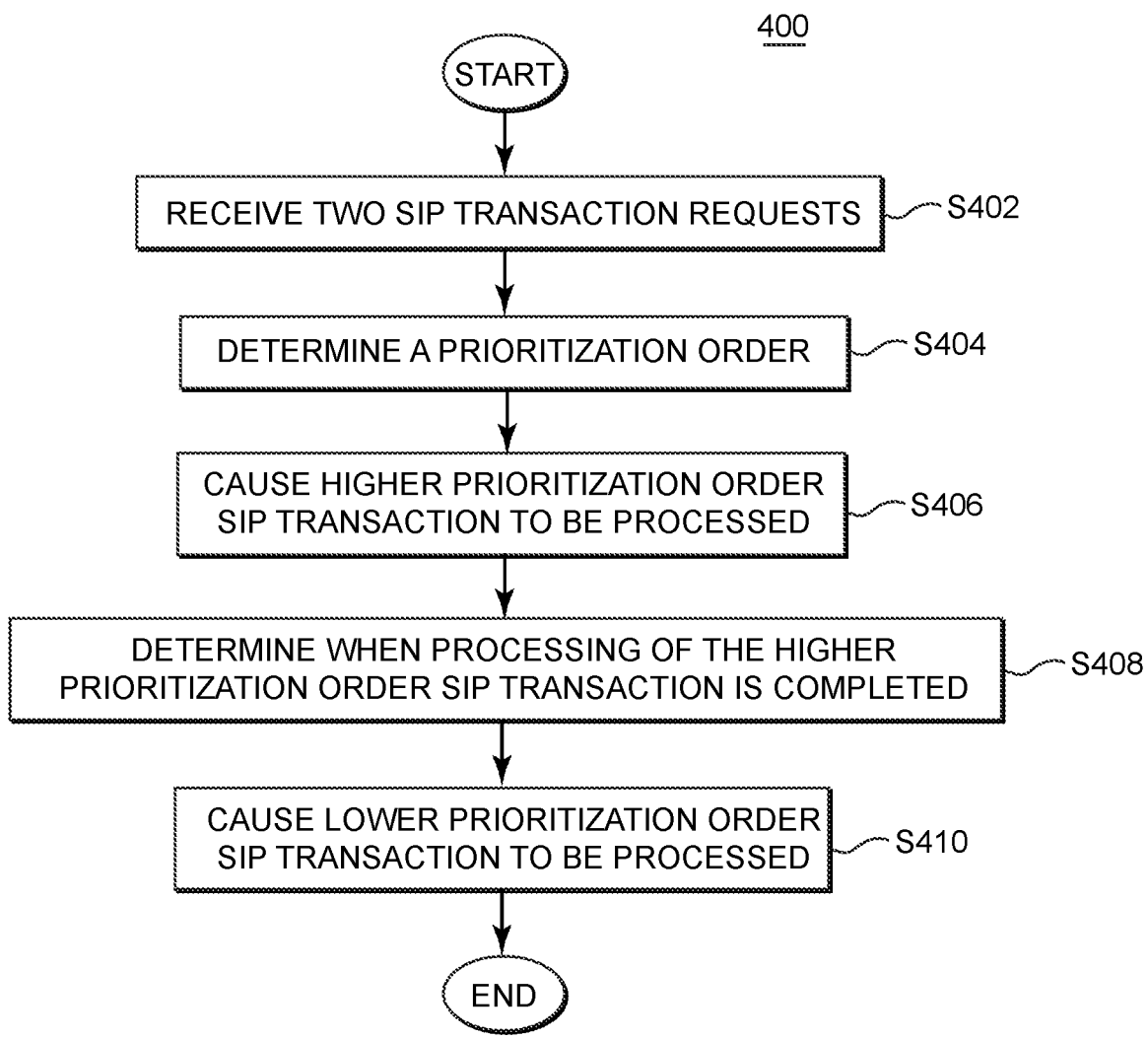
FIG. 4 is a flow diagram illustrating a first method for handling the processing of multiple SIP transactions that have been requested at substantially the same time.

As noted above in the Background section, one problem that can occur with processing SIP transactions is when a single IP telephony software application requests the processing of first and second SIP transactions in rapid succession. Specifically, problems can arise if the software application requests the processing of a second SIP transaction before processing of the first SIP transaction is complete. FIG. 4 illustrates steps of a first method of handling the processing of multiple SIP transactions which can help to alleviate or solve this sort of problem.

The method 400 begins and proceeds to step S402, where requests for two SIP transactions are received in rapid succession. With reference to the depiction of logical layers of a software application in FIG. 3, step S402 would involve the core application layer 304 sending requests for the processing of two SIP transactions to the SIP queue layer 306 in rapid succession. With respect to the depiction of an IP telephony software application in FIG. 2, step S402 would involve passing requests for the processing of two SIP transactions to the SIP transaction coordination unit in rapid succession.

In step S404, the SIP transaction prioritization unit 210 determines a priority order in which to process the two SIP transactions. The prioritization order could be based on which of the requested SIP transactions is viewed as the most important to accomplish. The prioritization order might also or alternately depend on whether processing of one of the SIP transactions must be performed before the second SIP transaction can be properly processed. In other instances, the prioritization order could simply be based on which of the SIP transactions was first requested. Of course, other considerations could also be taken into account in determining the prioritization order.

In step S406, the SIP transaction that has been assigned a higher prioritization order is processed. This can involve the SIP transaction initiation unit 214 causing the SIP transaction processing unit 216 to begin processing the higher prioritization order SIP transaction. With respect to the logical layers depicted in FIG. 3, this can involve the higher prioritization order SIP transaction being passed from the SIP queue layer 306 to the SIP processing layer 308.

In step S408, the SIP transaction termination determining unit 212 then determines when processing of the higher prioritization order SIP transaction has been completed. This could include monitoring the progress of the processing of the SIP transaction, and determining when processing of the SIP transaction is complete. In other instances, the SIP transaction termination determining unit 212 may look for a triggering event which indicates that processing of the higher prioritization order SIP transaction has been completed.

The way in which the SIP transaction termination determining unit 212 determines that processing of the SIP transaction has been completed can be very specific to the software application, to the way in which the software application operates, and/or to the type of SIP transaction is that being processed. In some instances, it may be possible to determine that processing of a SIP transaction is complete by determining when a dialog object which held the SIP transaction releases the transaction. In other instances, it may be possible to determine that processing of a SIP transaction is complete by noting when the software application sends an acknowledgement message to the other software application that is part of the ongoing SIP dialog.

Of course, the SIP transaction termination determining unit 212 could determine that processing of a SIP transaction is complete in other ways. For example, a SIP engine being used by the software application could be instructed to send a signal when processing of a requested SIP transaction is complete. In other instances, a state machine could be used to track the current state of processing of a SIP transaction. Thus, the state, which might be reflected as a variable value, would indicate when processing of the SIP transaction is complete.

Once it has been determined that processing of the higher prioritization order SIP transaction is complete, in step S410, processing of the lower prioritization order SIP transaction is initiated. Here again, this could involve the SIP initiation unit 214 causing the SIP transaction processing unit 216 to being processing the lower prioritization order SIP transaction. Once processing of the lower prioritization order SIP transaction is complete, the method ends.

In the method described above, no attempt is made to begin processing a second SIP transaction until processing of a first SIP transaction has been completed. Thus, the problems noted above can be avoided. Also, with a method as described above, when the logical SIP queue layer 306 receives two SIP transactions in rapid succession, it may be possible to decide which of the two SIP transactions should be processed first, which can also help to avoid problems. In other words, it may be possible to cause the second requested SIP transaction to be processed first.

Although the above description contemplated a scenario where requests for the processing of two SIP transactions are received in rapid succession, the same basic method can be used to prioritize and individually process three or more requested SIP transactions that are received within a short period of time.

In a related method, a core application layer 304 may send to the SIP queue layer 306 a request for the processing of a first SIP transaction, and that first SIP transaction may be passed along to the SIP processing layer 308 for action before a request for processing of a second SIP transaction is received at the SIP queue layer 306. Under these circumstances, the request for the processing of the second SIP transaction is held in the SIP queue layer 306 until the SIP transaction termination determining unit 212 determines that processing of the first SIP transaction is complete. The second SIP transaction is then passed from the SIP queue layer 306 to the SIP processing layer 308 for action. In this related method, there is no attempt to arrange the two requested SIP transactions in a prioritization order. However, it is still possible to ensure that the software application only attempts to process a single SIP transaction at a time, thereby avoiding many of the problems noted above.

Figure 5:
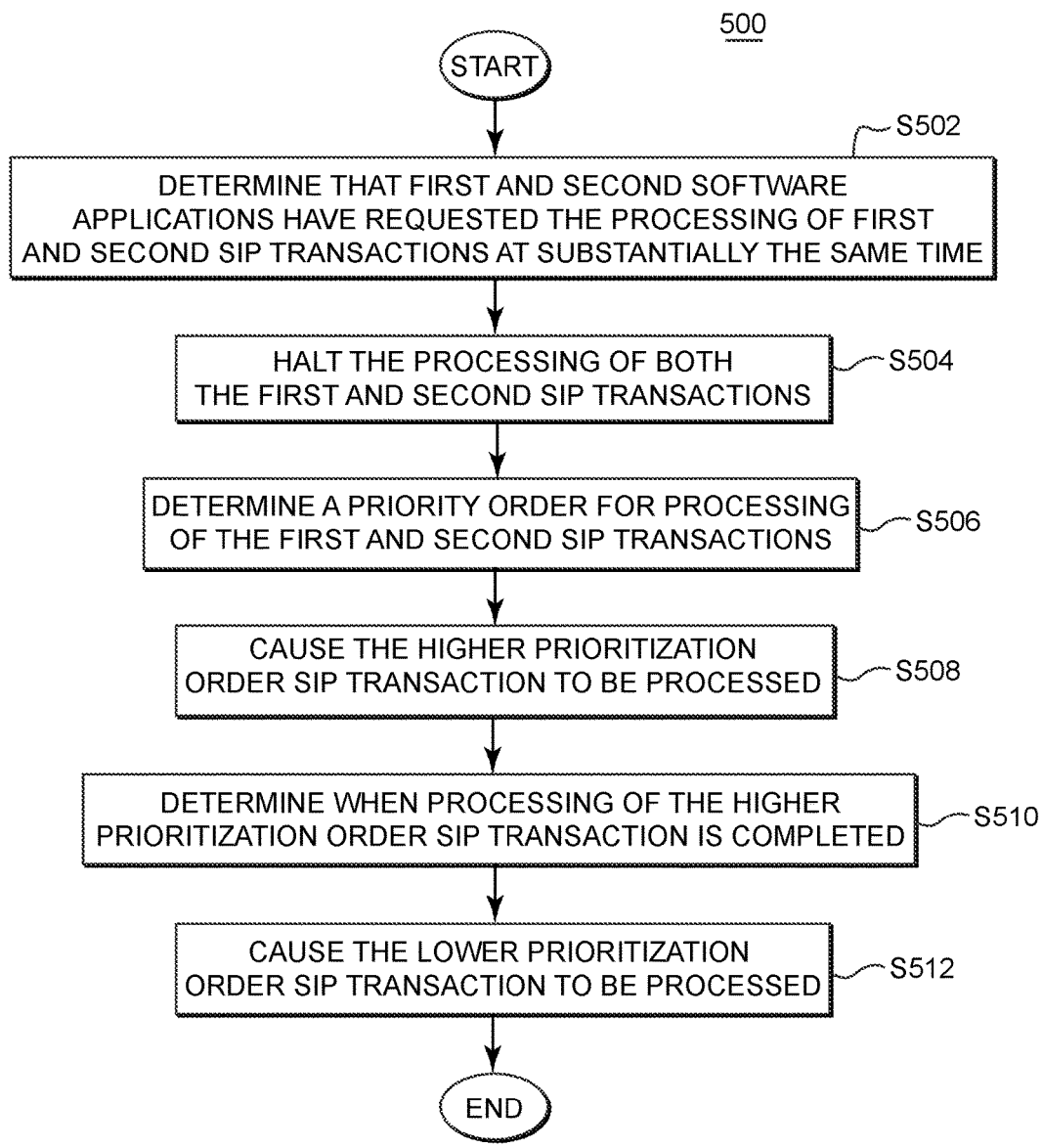
FIG. 5 is a flow diagram illustrating a second method for handling the processing of multiple SIP transactions that have been requested at substantially the same time.

FIG. 5 illustrates steps of another method of handling requests for the processing of multiple SIP transactions that are issued at approximately the same time. In this instance, however, a first request for the processing of a first SIP transaction is issued by a first software application, and a second request for the processing of a second SIP transaction is issued by a second software application that is involved in a SIP dialog with the first software application.

The method 500 begins and proceeds to step S502, in which a determination is made that first and second software applications have requested the processing of first and second SIP transactions at approximately the same time. This determination could be made in a variety of ways.

In some instances, the first software application could send an initial request message as part of a first SIP transaction to the second software application, and then receive a request message from the second software application connected with a second SIP transaction that has been initiated by the second software application. This would mean that the second software application sent its request message in connection with the second SIP transaction before it received the request message sent from the first software application in connection with the first SIP transaction. Under these circumstances, the second software application would likely receive the first request message from the first software application sent in connection with the first SIP transaction immediately after it sends its request message to the first software application in connection with the second SIP transaction. At this point either or both of the software applications could make a determination that first and second software applications have requested the processing of first and second SIP transactions at approximately the same time.

The determination that the first and second software applications have requested the processing of first and second SIP transactions at approximately the same time could be made in different ways. For example, in some embodiment, whenever a first software application sends a request for processing of a SIP transaction to a second software application, and then instead of receiving a response message from the second software application the first software application receives a request for processing of a different SIP transaction from the second software application, the first software application could determine that both software applications have requested the processing of different SIP transactions as approximately the same time.

In other instances, if a first software application sends an initial request message in connection with a SIP transaction, and then receives a REQUEST PENDING message back from the second software application, this would typically indicate that the second software application has already begun the processing of a separate SIP transaction. Thus, here again, we would be dealing with a situation where first and second software applications have requested the processing of first and second SIP transactions at approximately the same time.

In another situation, a first software application could be preparing to send a SIP request message as part of a new SIP transaction when a new SIP request message is received from a second software application. This would be yet another instance where first and second software applications have requested the processing of first and second SIP transactions at approximately the same time.

For purposes of this explanation, we will assume that the first software application determines that the first and second software applications have requested the processing of first and second SIP transactions at approximately the same time. Next, in step S504, processing of both the first and second SIP transactions is halted. In some embodiments, the first software application could take steps to halt the processing of both requested SIP transactions. This might be accomplished by the first software application halting the processing of the first SIP transaction that it initiated, and also by sending an abort message to the second software application to cause the second software application to halt the processing of the second SIP transaction that it initiated. Of course, halting the processing of the first and second SIP transactions could be accomplished by other means.

In some embodiments where first and second software applications are engaged in a SIP dialog (such as an IP-based audio telephone call) the software application that initiated the SIP dialog (the calling party) could take responsibility for determining when first and second software applications have requested the processing of first and second SIP transactions at approximately the same time. In other embodiments, both software applications could be responsible for making this determination, and the first one to notice the condition could act to halt the processing of both SIP transactions.

In step S506, the SIP transaction prioritization unit 210 in one of the software applications determines a priority order in which to process the two SIP transactions. The prioritization order could be based on which of the requested SIP transactions is viewed as the most important to accomplish. The prioritization order will often be determined based on what is necessary to provide the best user experience.

For example, having a first software application tell a second software application to place a call on hold would take a high priority. If the second user is not notified that the first user placed the call on hold fairly quickly after that occurs, the second user would only hear silence, and would perhaps mistakenly think that the call had been disconnected, rather than simply placed on hold. Other similar considerations relating to the user experience may drive the prioritization order decision.

The prioritization order might also or alternately depend on whether processing of one of the SIP transactions must be performed before the second SIP transaction can be properly processed. In other instances, the prioritization order could simply be based on which of the SIP transactions was first requested. Of course, other considerations could also be taken into account in determining the prioritization order.

The software application that determines the priority order for the two SIP transactions could be the one that first noticed that the first and second software applications were attempting to simultaneously process first and second SIP transactions. In other instances, it could be the software application that halted the processing of both SIP transactions. In still other embodiments, the software application that initiated the dialog could be responsible for making the prioritization determination.

In step S508, processing of the SIP transaction that has been assigned a higher prioritization order is initiated. The software application that made the prioritization order determination could be responsible for causing both SIP transactions to be processed. In alternate embodiments, the first and second software applications could each be responsible for initiating the processing of their own respective SIP transactions.

In step S510, the software application that initiated processing of the higher prioritization order SIP transaction determines when processing of the higher prioritization order SIP transaction has been completed. Then, in step S512, processing of the lower prioritization order SIP transaction is initiated. Once processing of the lower prioritization order SIP transaction is complete, the method ends.

In the method described above, it was assumed that first and second software applications each request the processing of a SIP transaction at substantially the same time. However, in some instances, the first and second software applications may find that they are attempting to process three or more SIP transactions at substantially the same time. This could occur, for example, in a conference calling scenario, where more than two software applications are engaged in a telephony communication. If that is the case, the same basic procedures outlined above would be followed to halt the processing of all partially completed SIP transactions, and to then process each SIP transaction individually in a prioritized order.

Figure 6:
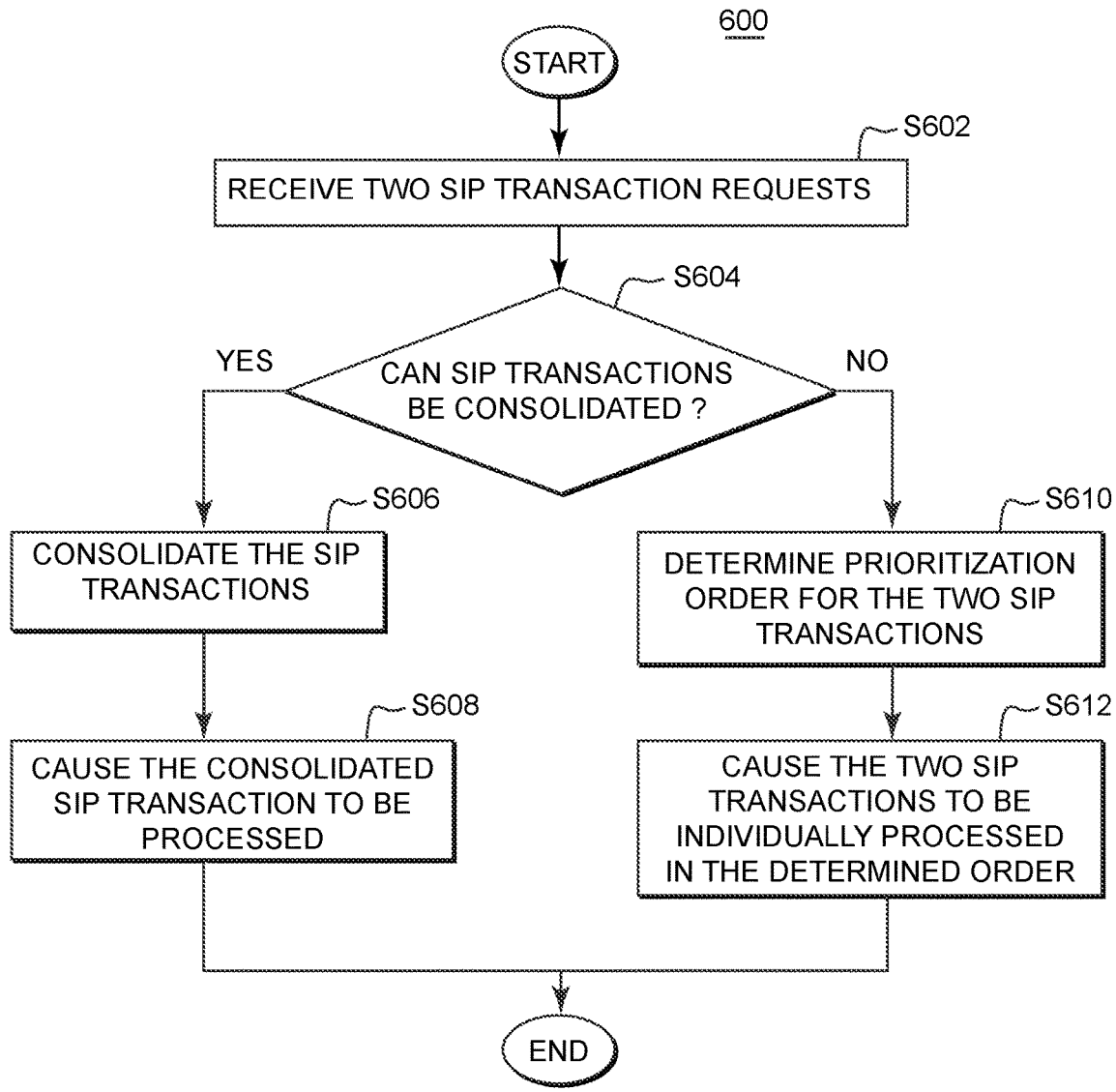
FIG. 6 is a flow diagram illustrating a third method for handling the processing of multiple SIP transactions that have been requested at substantially the same time.

FIG. 6 illustrates steps of another method that involves consolidating two SIP transactions that have been requested at substantially the same time into a single SIP transaction. The method 600 begins and proceeds to step S602, where requests for the processing of first and second SIP transactions are received in rapid succession. With reference to FIG. 3, this could involve the core application layer 304 sending first and second requests for the processing of first and second SIP transactions to the SIP queue layer 306 in rapid succession. With reference to FIG. 2, this would involve the SIP coordination unit 206 receiving first and second requests for the processing of first and second SIP transactions in rapid succession.

In step S604, a SIP transaction consolidation unit 208 of the SIP transaction coordination unit determines if it is possible to consolidate the first and second SIP transactions into a single SIP transaction. For example, a request to place a call on hold and a request to upgrade the call from an audio call to a video call might be accomplished together. If so, in step S606 the SIP transaction consolidation unit 208 consolidates the first and second SIP transactions into a single SIP transaction. Then, in step S608, the SIP transaction initiation unit 214 submits the consolidated SIP transaction to the SIP transaction processing unit 216 for processing.

In some instances, where first and second software applications each send SIP transaction requests at approximately the same time, it may be possible for one of the software applications to consolidate both requests into a singe transaction. For example, assume a first software application sends a request to place a call on hold to a second software application. However, before that SIP transaction can be processed by the second software application, the second software application sends a request to the first software application seeking to upgrade the call from audio to video. In this situation, both software applications would halt any attempt to process their own request and the request received from the other software application. However, at that point the first software application, knowing that the second software application wants to upgrade the call to a video call, could send a consolidated SIP transaction request to the second software application that seeks to both place the call on hold, and upgrade the call to video. When the second software application receives that request for processing, it could check its own queue and note that it had a pending request to upgrade the call to video. Thus, as part of the processing of the request received from the first software application, the second software application would delete the video upgrade request from its own queue.

In situations where first and second SIP transactions are initiated by first and second software applications, respectively, at approximately the same time, and where the two SIP transactions are to be consolidated into a single SIP transaction, there must be a way to determine which of the two software applications will create and send the consolidated SIP transaction. The decision about which software application will act to create and send the consolidated SIP transaction could be based on which of the two software applications sent the first SIP transaction, based on a predetermined agreement between the two software applications, or based on some other grounds.

If the determination made in step S604 indicates that the first and second SIP transactions cannot be consolidated, then in step S610, the SIP transaction prioritization unit 210 determines a priority order for processing of the first and second SIP transactions. Then, in step S612, the SIP transactions are individually processed in the determined prioritization order. This would involve steps similar to those discussed above, in which a SIP transaction termination determining unit 212 determines when processing of the higher prioritization order SIP transaction is completed before processing of the lower prioritization order SIP transaction is initiated. The method would then end.

A method like the one described above in connection with FIG. 6, for consolidating two SIP transactions, could be performed in conjunction with a method as described above in connection with FIG. 5, for handling the processing of first and second SIP transactions requested by first and second software applications. In other words, when a determination is made that first and second software applications have requested the processing of first and second SIP transactions at substantially the same time, the first and second SIP transactions could be consolidated into a single SIP transaction using a method as illustrated in FIG. 6.

The foregoing description makes reference to certain standard SIP messaging. In alternate embodiments, different types of messaging could be used to establish a VOIP telephone call between a calling party and a called party. SIP signaling is merely one way in which it could occur. Even when a different signaling protocol is used, the same systems and methods described above could be used to alleviate or cure problems with handling multiple transactions that have been requested at substantially the same time.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of handling multiple session initiation protocol (SIP) transactions during a SIP dialog, a SIP transaction including at least a SIP request message and a SIP response message, comprising:
    receiving requests for the processing of two SIP transactions using at least one processor;
    determining whether the two SIP transactions can be consolidated into a single SIP transaction using at least one processor;
    consolidating the two SIP transactions into a single SIP transaction when it is determined that the two SIP transactions can be consolidated into a single SIP transaction, and thereafter initiating the processing of the consolidated SIP transaction;
    determining, when the two SIP transactions cannot be consolidated into a single SIP transaction, a prioritization order for processing the two SIP transactions using at least one processor;
    initiating the processing of a first of the two SIP transactions that was determined to have a higher priority order;
    determining when processing of the first SIP transaction has been completed; and
    initiating the processing of the second of the two SIP transactions that was determined to have a lower priority order after processing of the first SIP transaction is determined to have been completed.

2. The method of claim 1, wherein the requests for the processing of two SIP transactions are received from a core application layer of the software application, and wherein initiating the processing of the first and second SIP transactions comprises passing first and second SIP transaction requests to a SIP processing layer of the software application.

3. The method of claim 1, wherein determining when processing of the first SIP transaction has been completed comprises determining that a dialog object that holds the first SIP transaction has discarded the first SIP transaction.

4. The method of claim 1, wherein determining when processing of the first SIP transaction has been completed comprises determining that a SIP processing layer of the software application has sent a message to a core application layer of the software application indicating that the first transaction has been completed.

5. The method of claim 1, wherein determining when processing of the first SIP transaction has been completed comprises determining when an acknowledgment message is sent in reaction to receiving a response message from a second software application to which the first SIP transaction request was originally directed.

6. A non-transitory computer readable medium that contains instructions which, when performed by one or more processors, cause the one or more processors to perform a method for handling multiple session initiation protocol (SIP) transactions during a SIP dialog, a SIP transaction including at least a SIP request message and a SIP response message, the method comprising:
   receiving requests for the processing of two SIP transactions;
   determining whether the two SIP transactions can be consolidated into a single SIP transaction;
   consolidating the two SIP transactions into a single SIP transaction when it is determined that the two SIP transactions can be consolidated into a single SIP transaction, and thereafter initiating the processing of the consolidated SIP transaction;
   determining a prioritization order for processing the two SIP transactions;
   initiating the processing of a first of the two SIP transactions that was determined to have a higher priority order;
   determining when processing of the first SIP transaction has been completed; and
   initiating the processing of the second of the two SIP transactions that was determined to have a lower priority order after processing of the first SIP transaction is determined to have been completed.

7. The non-transitory computer readable medium of claim 6, wherein the requests for the processing of two SIP transactions are received from a core application layer of a software application, and wherein initiating the processing of the first and second SIP transactions comprises passing first and second SIP transaction requests to a SIP processing layer of the software application.

8. The non-transitory computer readable medium of claim 6, wherein determining when processing of the first SIP transaction has been completed comprises determining that a dialog object that holds the first SIP transaction has discarded the first SIP transaction.

9. The non-transitory computer readable medium of claim 6, wherein determining when processing of the first SIP transaction has been completed comprises determining that a SIP processing layer of the software application has sent a message to a core application layer of the software application indicating that the first transaction has been completed.

10. The non-transitory computer readable medium of claim 6, wherein determining when processing of the first SIP transaction has been completed comprises determining when an acknowledgment message is sent in reaction to receiving a response message from a second software application to which the first SIP transaction request was originally directed.

\* \* \* \* \*